United States Patent [19]

Sung

[11] Patent Number: 5,409,030
[45] Date of Patent: Apr. 25, 1995

[54] APPARATUS FOR PREVENTING AN OUTFLOW OF A FUEL WITHIN A FUEL TANK OF A VEHICLE

[75] Inventor: Younkwan Sung, Kyungsangnam, Rep. of Korea

[73] Assignee: Hyundai Motor Company, Seoul, Rep. of Korea

[21] Appl. No.: 184,750

[22] Filed: Dec. 29, 1993

[30] Foreign Application Priority Data

Dec. 30, 1992 [KR] Rep. of Korea ............. 92-27759

[51] Int. Cl.6 ............................................. F16K 17/36
[52] U.S. Cl. ............................. 137/39; 137/43; 137/202
[58] Field of Search ........................... 137/39, 43, 202

[56] References Cited

U.S. PATENT DOCUMENTS

| | | | |
|---|---|---|---|
| 3,910,302 | 10/1975 | Sudhir | 137/43 |
| 4,679,581 | 7/1987 | Mears | 137/43 |
| 4,982,757 | 1/1991 | Ohasi | 137/202 |
| 5,004,002 | 4/1991 | Kobayashi | 137/43 X |

Primary Examiner—Robert G. Nilson
Attorney, Agent, or Firm—Birch, Stewart, Kolasch & Birch

[57] ABSTRACT

The present invention provides an apparatus for preventing an outflow of a fuel formed in a fuel tank of a vehicle, the apparatus including a fuel tank disposed in the vehicle to store a fuel and having an outlet passage to evaporate a fuel vapor of the fuel to a canister, a casing disposed to protrude into the fuel tank and having a plurality of holes formed therein for absorbing the fuel vapor, a float elastically supported by a first elastic member within the casing and having a head for shutting off the outlet passage, and a check valve capable of discharging the fuel vapor within the fuel tank by opening and closing an orifice penetrating the head according to pressure within the fuel tank.

10 Claims, 2 Drawing Sheets

5,409,030

APPARATUS FOR PREVENTING AN OUTFLOW OF A FUEL WITHIN A FUEL TANK OF A VEHICLE

BACKGROUND OF THE INVENTION

Field of the Invention

The present invention relates to an apparatus for preventing a fuel within a fuel tank of a vehicle from flowing out of the fuel tank via a passage connected to a canister at the time of a vehicle's being in a severe turning position or a sharply-steep road.

Description of the Prior Art

A vehicle is provided with a canister for absorbing a fuel vapor produced by evaporating the fuel within a fuel tank by a change of a temperature and for transmitting the fuel vapor to the inlet system of an engine together with purge air flowed by a negative pressure produced at the time of driving of an engine.

Such a fuel vapor re-circulation system is installed in all kinds of automotive vehicles to restrain discharge gas, and this canister communicates with the fuel tank installed in a vehicle via a vent tube.

If the fuel in the fuel tank is evaporated by a temperature change, a gas generated by the evaporated fuel moves to the canister. In such a structure, the fuel inside the fuel tank flows back to the canister via the fuel vapor vent tube at the time of the vehicle's being in a severe turning position or sharply-steep road, or rolling over.

As a method for solving this problem, a check valve means is installed between the fuel tank and the canister so that the fuel does not flow backwards.

If this means is disposed between vent tubes, in a case that the vent tubes are broken, the fuel within the fuel tank may flow out to the atmospheric air. Thus, it is preferable that the check valve means is disposed within the fuel tank.

Japanese Patent Unexamined Publication No. 92-151332 discloses a method for preventing the outflow of a fuel in any case by controlling pressure within a fuel tank, simultaneously with preventing escape of the fuel from within this fuel tank.

According to this method, there are provided a guide wall for guiding the lift of a float that is provided on a wall under a case, and a stopper limiting the rise of the float on the guide wall to prevent the outflow of the fuel by the rise of the float. If the pressure within the fuel tank increases, the stopper controls the rise of the float.

In such a system, the stopper suppresses the rise of the float, and it depends on the height of a casing, the thickness of an upper substrate and their quality of material in order that the stopper drops the float at a position the float ascends maximum. Thus, when the fuel tank is in the state of high pressure, effects as desired cannot be attained.

SUMMARY OF THE INVENTION

An object of the present invention is to provide an apparatus for preventing the outflow of a fuel within a fuel tank of a vehicle that can carry out perfectly the control of pressure within the fuel tank, simultaneously with completely shutting off the outflow of the fuel within the fuel tank.

In order to achieve the object, the present invention provides an apparatus for preventing an outflow of a fuel formed in a fuel tank of a vehicle, comprising:

a fuel tank disposed in the vehicle to store a fuel and having an outlet passage to supply a fuel vapor generated in the fuel tank to a canister;

a casing disposed to be protruded into the fuel tank and having a plurality of holes for absorbing the fuel vapor;

a float elastically supported by a first elastic member within the casing and having a head for interrupting the outlet passage; and a check valve capable of discharging the fuel vapor within the fuel tank by opening and closing an orifice penetrating the head in accordance with pressure within the fuel tank.

The float includes a base circle smaller than the casing in diameter and a plurality of acute protrusions extending outward from the base circle in order to reduce a friction resistance.

The head includes upper and lower portions, and the upper portion is formed to be smaller than the lower portion in diameter. The float ascends at the time of joining of a fuel buoyancy within the fuel tank and an elasticity of the first elastic member.

The first elastic member is disposed in a sheet groove formed in the float to stabilize a posture of the float. And the check valve is elastically supported by a second elastic member formed to be smaller than the first elastic member in an elastic force and a size.

DETAILED DESCRIPTION OF THE PREFERRED EMBODIMENTS

Figure 1:
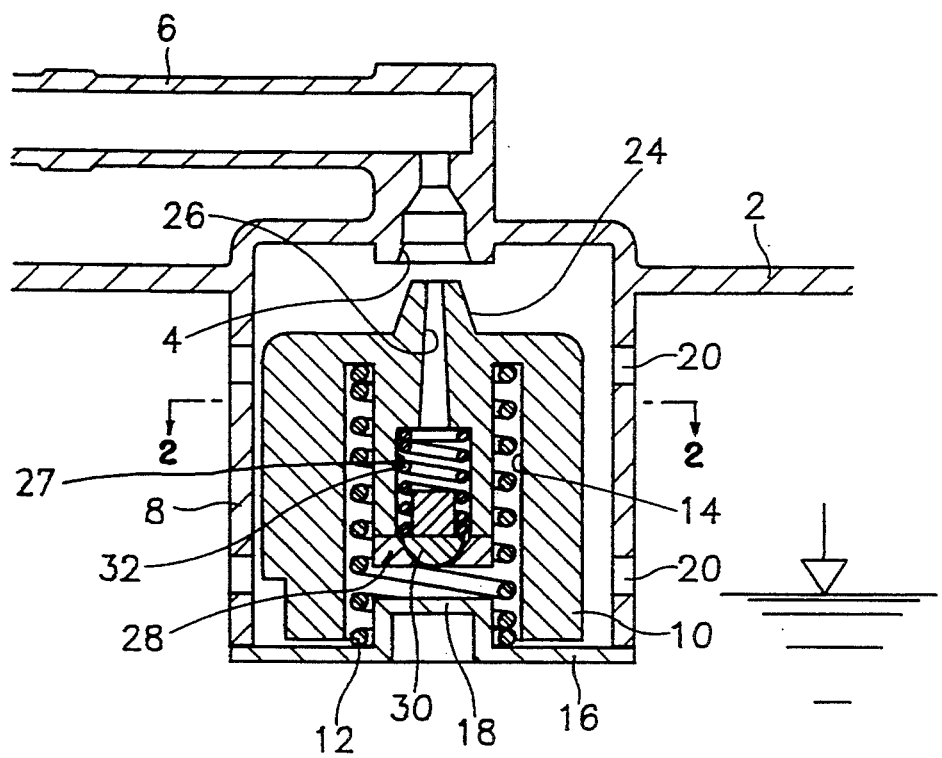
FIG. 1 is a side sectional view of an apparatus for preventing the outflow of a fuel in accordance with the present invention.

FIG. 1 is a side sectional view of an apparatus for preventing the outflow of a fuel in accordance with the present invention, in which a partial upper board of a fuel tank 2 is shown.

An outlet passage 4 is formed in the upper board of the fuel tank 2 to connect a connector 6 extending for a hose-connection with a canister (not illustrated). A casing 8 is integrally formed inside the fuel tank 2 and has a means for discharging a fuel vapor within the fuel tank and preventing the outflow of the fuel.

The above means includes a float 10 liftably disposed within the casing 8 and a first elastic member 12 facilitating the lift when the float 10 receives buoyancy by the fuel within the fuel tank.

An upper portion of the first elastic member 12 is disposed inside a sheet groove 14 and its lower portion is inserted into a protrusion 18 of a sheet plate 16 fixed to the lower side of the casing 8 such that the float has a stable posture.

Figure 2:
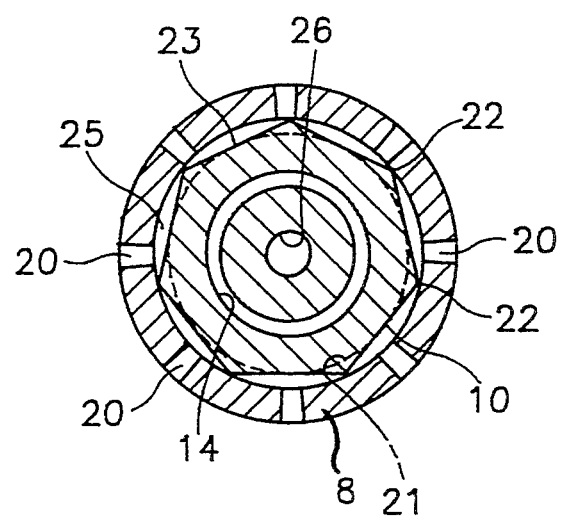
FIG. 2 is a sectional view as taken along lines 2—2 of FIG. 1.

A plurality of holes 20 are formed in the casing 8 to transmit a fuel vapor within the fuel tank 2 that flows into the casing 8 to the canister via the outlet passage 4. If the float 10 adheres closely to the inside of the casing 8 due to vibration of the vehicle, these holes 20 may be closed. The float 10 of the present invention includes a plurality of acute protrusions 22 from a base circle 21 of an outside diameter smaller than the inside diameter of the casing 8 as shown in FIG. 2. These acute protrusions 22 contact the inner circumferential surface of the casing 8.

A passage 25 is formed between a straight line portion 23 connecting the acute protrusions 22 to each other and the inner circumferential surface of the casing 8 such that the fuel vapor within the fuel tank 2 flows through the passage 25.

The float 10 has a small portion contacting the inner circumferential surface of the casing 8, and a friction resistance becomes small when the float 10 descends and ascends.

The above float 10 includes a head 24 disposed around the outlet passage 4 to shut off the outflow of the fuel. The top of this head 24 is small in diameter to facilitate insertion into the outlet passage 4.

An orifice 26 penetrating the head 24 is formed in the float 10. This orifice 26 opens and closes by a check valve 28 for controlling pressure within the fuel tank 2 to discharge the fuel vapor.

The check valve 28 is installed in a space 27 communicating with the orifice 26 in the float 10. A valve spool 30 in the space 27 is elastically supported by a second elastic member 32, and when the pressure within the fuel tank 2 is raised, the valve spool 30 compresses the second elastic member 32 and moves such that the orifice 26 communicates with the fuel tank 2.

The hole formed lowermost of the holes 20 in the casing 8 is disposed on a position spaced from the fuel surface in a condition that the fuel is filled in the fuel tank 2.

When a car runs normally without vibration of its body, in the apparatus for preventing the outflow of a fuel in accordance with the present invention, the float 10 within the casing 8 does not contact the fuel within the fuel tank 2. Thus, buoyancy by the fuel within the fuel tank does not apply to the float 10, and the float 10 compresses the first elastic member 12 by its weight to be disposed downward.

The fuel vapor within the fuel tank 2 flows into the casing 8 via the holes 20 and is evaporated upward through the passage 25 formed between the float 10 and the casing 8 to then flow into the canister via the outlet passage 4.

Figure 3:
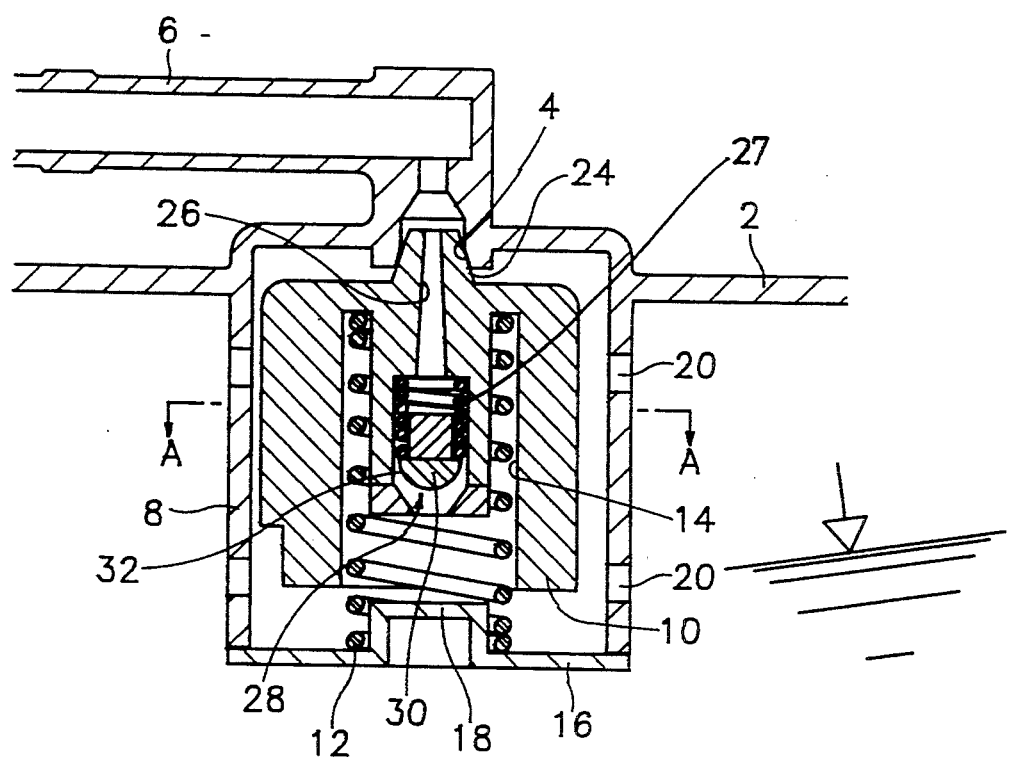
FIG. 3 is a side sectional view of the apparatus of the present invention that shuts off the outflow of the fuel.

However, if the car turns severely or rolls over, the fuel within the fuel tank 2 flows such that the lower portion of the float 10 is sunk in the fuel. And the float 10 receives buoyancy from this fuel (FIG. 3).

Accordingly, the float 10 receives buoyancy from both the fuel and a force of the first elastic member 12. The head 24 of the float 10 is then inserted into the outlet passage 4 to close the outlet passage 4.

The fuel within the fuel tank 2 is prevented from flowing out even in the case that the car body leans to one side. After the car runs with high speed for a long time or is parked in a high temperature for a long time, a fuel vapor is generated in the fuel tank, and the pressure within the fuel tank 2 may increase.

At this point, if the pressure within the fuel tank 2 is greater than the elasticity of the second elastic member 32 of the check valve, the orifice 26 communicates with the fuel tank 2 while the valve spool 30 is pushed upward.

Accordingly, the fuel vapor produced within the fuel tank 2 quickly escapes through the orifice 26, and if the pressure within the fuel tank 2 is decreased in this process, the valve spool 30 closes the orifice 26 by the elasticity of the second elastic member 32 again.

Controlling the pressure within the fuel tank 2 is carried out thereby, and the float 10 lifts smoothly because the casing 8 just contacts the acute protrusions 22 so that rapid and positive effects may be achieved.

The apparatus for preventing the outflow of the fuel in accordance with the present invention may prevent the outflow of the fuel by shutting off the outlet passage rapidly, and may discharge gas by controlling the pressure of the fuel tank, in the case where the fuel within the fuel tank flows out to the outlet passage communicating with the canister because the car body vibrates or leans to one side and the like.

Since the float installed in the casing has a fuel shutting off function and a pressure controlling function, the apparatus of the present invention is structurally much more simple than a conventional apparatus that should have fuel shutting off means and pressure controlling means separately.

While this invention has been described in connection with what is presently considered to be the most practical and preferred embodiments, it is to be understood that the invention is not limited to the disclosed embodiments, but, on the contrary, it is intended to cover various modifications and equivalent arrangements included within the spirit and scope of the appended claims.

What is claimed is:

1. An apparatus formed in a fuel tank of a vehicle for preventing an outflow of a fuel, said apparatus comprising:

an outlet passage formed in said fuel tank to supply a fuel vapor generated in the fuel tank to a canister;

a casing disposed to protrude into said fuel tank below and in communication with said outlet passage, said casing having a plurality of holes formed therein for absorbing the fuel vapor from said fuel tank;

a float elastically supported by a first elastic member within said casing and having a head for engagement with said outlet passage; and a check valve capable of discharging the fuel vapor within the fuel tank by opening and closing an orifice penetrating said head in accordance with pressure within the fuel tank, wherein said check valve is elastically supported by a second elastic member formed to be smaller than the first elastic member in an elastic force and size.

2. The apparatus according to claim 1, wherein said float includes a base circle smaller than the casing in diameter and a plurality of acute protrusions extending outward from said base circle in order to reduce a friction resistance.

3. The apparatus according to claim 1, wherein said head includes upper and lower portions, the upper portion being formed to be smaller than the lower portion in diameter.

4. The apparatus according to claim 1, wherein said float ascends according to a fuel buoyancy within the fuel tank and an elasticity of said first elastic member.

5. The apparatus according to claim 1, wherein said first elastic member is disposed in a groove formed in the float to stabilize a posture of the float.

6. An apparatus for preventing an outflow of a liquid fuel in a fuel tank, comprising:

a canister receiving a gaseous fuel from the fuel tank;

a casing disposed between the canister and the fuel tank, said casing including a plurality of inlet passages communicating with the fuel tank and an outlet passage communicating with the canister; and a float slidably mounted within said casing and elastically supported by a first elastic member, and having a head for sealing the outlet passage when said float rises to the outlet passage and an orifice at a bottom of which a check valve for controlling the opening of the orifice in accordance with pressure within the fuel tank is disposed, said check valve elastically supported by a second elastic member.

7. The apparatus according to claim 6, wherein said float has a plurality of acute protrusions in order to reduce a friction resistance and to permit a gap between the float and the casing.

8. The apparatus according to claim 6, wherein the first and second elastic members are springs.

9. The apparatus according to claim 6, wherein the head of said float has a conical exterior surface.

10. The apparatus according to claim 6, wherein the second elastic member is smaller than the first one.

* * * * *